United States Patent [19]

Hold et al.

[11] 4,152,077
[45] May 1, 1979

[54] HOMOGENIZATION EXTRUDER

[75] Inventors: Peter Hold, Milford, Conn.; Zehev Tadmor, Teaneck, N.J.; Hans R. Scharer, Wallingford, Conn.

[73] Assignee: USM Corporation, Farmington, Conn.

[21] Appl. No.: 857,181

[22] Filed: Dec. 2, 1977

[51] Int. Cl.² ............................................. B29B 1/06
[52] U.S. Cl. ................................................... 366/90
[58] Field of Search ...................... 366/90, 89, 88, 79, 366/80, 82, 97, 98; 425/190, 208, 207

[56] References Cited

U.S. PATENT DOCUMENTS

| | | | |
|---|---|---|---|
| 3,411,179 | 11/1968 | Gregory | 425/190 |
| 3,687,423 | 8/1972 | Koch | 425/208 |
| 3,814,779 | 6/1974 | Wiley | 425/208 |
| 3,850,414 | 11/1974 | Scharer | 366/89 |
| 3,867,079 | 2/1975 | Kim | 425/208 |

Primary Examiner—Robert W. Jenkins
Attorney, Agent, or Firm—Donald N. Halgren; Richard B. Megley; Vincent A. White

[57] ABSTRACT

An extruder machine for processing thermoplastic materials such as low density polyethylene, the extruder incorporating a body having a bore therethrough with a rotor journalled therein and having several mixing and cooling sections set thereon in succession. The mixing sections on the rotor are multiple flighted defining primary and secondary channels having their discharge and entrances respectively blocked or restricted by annular dam arrangements. The bore includes a plurality of annular grooves of symmetrical or non-symmetrical cross-sectional configurations along the axis of the bore which grooves are slightly displaced in the bore with respect to the annular restrictions disposed on the rotor. The rotor, however, is axially displaceable to permit variations in the mixing intensity upon the extrudite being worked, by allowing the annular restrictions on the rotor to be controllably juxtaposed with the annular grooves in the bore of the extruder machine.

5 Claims, 4 Drawing Figures

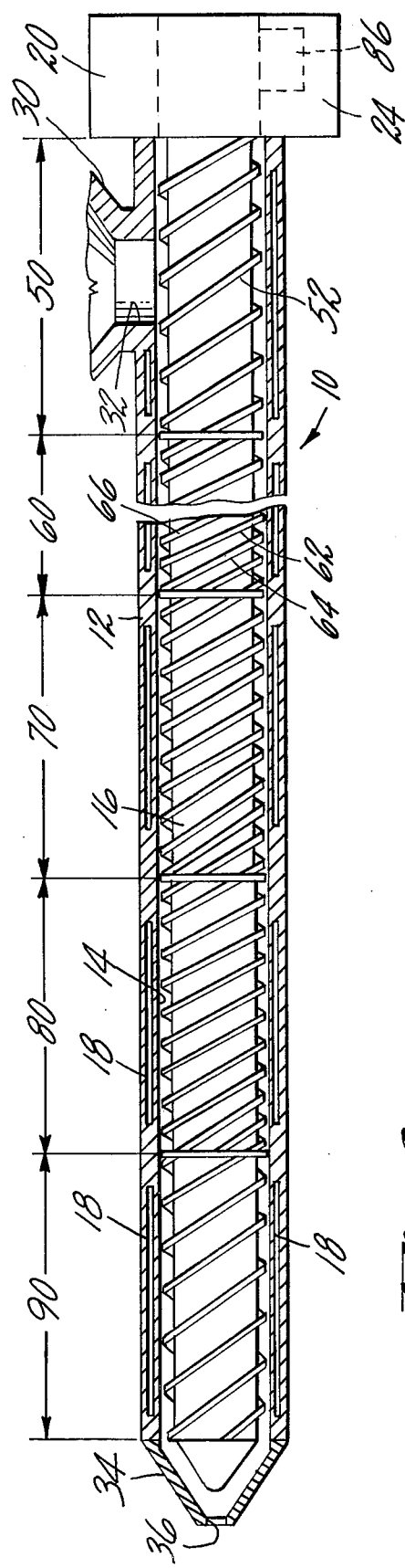
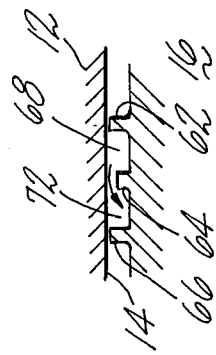
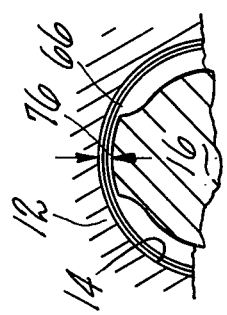
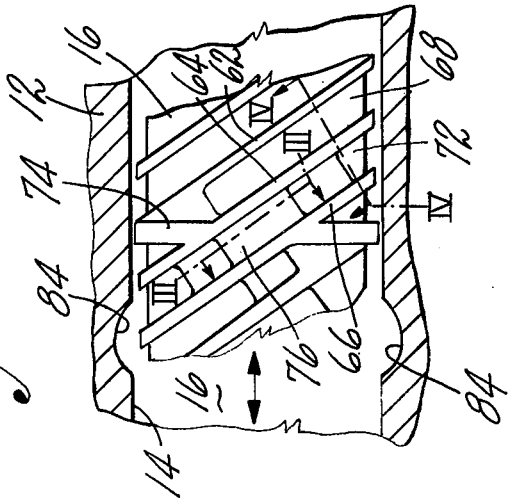

HOMOGENIZATION EXTRUDER

BACKGROUND OF THE INVENTION

1. Field of the Invention

This invention relates to thermoplastic extrusion machines, and more particularly to a configuration of the bore and rotor arranged therein.

2. Prior Art

Physical and optical properties of low density polyethylene are improved by mechanical shearing of the molten material. Additives such as processing aids, stabilizers and coloring agents are usually put in the material during the mechanical shearing processing. Historically, this mechanical shearing has been done in the intensive mixers or in cold feed extruders by remelting material through the application of mechanical shear forces. Since this material is originally produced as a hot molten liquid, this remelting process involves intermediate pelletizing, cooling and drying steps in the originally produced material.

A variety of attempts have been made in the past to increase the capabilities of extruder machines or to increase the amount of work put into the thermoplastic material in the extruder machine. These attempts have included multi-flighted extrusion screws, or rotors, having primary and secondary channels associated therewith. The rotor would be divided into a plurality of sections, for homogenizing, feeding and pumping the extrudite therealong. One or more of the channels in one or more of the sections in the rotor, might have a dam to provide back pressure to the thermoplastic material being worked through the extruding machine between the outside diameter of the rotor and the inside diameter of the bore disposed about the rotor. A machine of this type is shown in U.S. Pat. Nos. 3,411,179 to Gregory et al, and 3,850,414 (now disclaimed) to Scharer.

The shearing action of these machines is improved by the back pressure created by the dams across the channels in the rotors. However, the back pressure affects the heat removal rate of the machine, and some types of thermoplastic material may require more or less back pressure, shear mixing and homogenizing, or heat removal rates than other types of thermoplastic material.

It is therefore an object of the present invention to provide a homogenizing extrusion machine with capabilities to extrude a variety of thermoplastic materials, including low density polyethylene by being able to vary or eliminate the homogenization or mixing therewithin.

SUMMARY OF THE INVENTION

The present invention relates to an extruder machine for working thermoplastic material, such as low density polyethylene, to improve the physical and optical properties thereof. The extruder machine includes a body having a longitudinal bore extending therethrough. Disposed at either end of the bore is an opening for feeding and discharging the thermoplastic material worked therein. A rotor is journalled within the bore. The rotor has a plurality of helical lands formed thereon called flights, to effect movement and working of the material therethrough. The rotor body comprises a plurality of functional sections for mixing and causing a mechanical shear within the material. A plurality of dams are generally annularly arranged and are spaced between certain flights to provide a back pressure and hence, more mixing to the material being worked. The longitudinal bore containing the rotor, also has a plurality of channels disposed therearound.

The rotor disposed in the bore is axially displaceable to permit control, release, or elimination of the back pressure created by the dams at certain locations between adjacent flights. The channels provide a by-pass of the thermoplastic material around the dams. That is, they permit a variation in the processing of one or several types of thermoplastic material, while not requiring major machine overhaul or re-work therebetween. The structure of the bore and its adaptation with an axially displaceable extruder screw or rotor having dams causing back pressure therein, permits a wide variation in plastic processing capabilities.

BRIEF DESCRIPTION OF THE DRAWINGS

The objects and advantages of the present invention will become more apparent when viewed in conjunction with the following drawings in which:

FIG. 1 is an elevational view, partially in section, of an extruder machine constructed according to the principles of the present invention;

FIG. 2 is an enlarged view of a portion of FIG. 1;

FIG. 3 is a view taken along the lines III—III of FIG. 2; and

FIG. 4 is a view taken along the lines IV—IV of FIG. 2.

DESCRIPTION OF THE PREFERRED EMBODIMENTS

Referring now to the drawings, and particularly to FIG. 1, there is shown an extruder machine 10. The extruder machine 10 includes a main body portion 12 having a bore 14 extending longitudinally therethrough. A screw or rotor 16 is rotatively journalled within the bore 14. The body portion 12 also includes heat transfer fluid flow paths 18 adjacent the bore 14 to maximize heat transfer therebetween.

The rotor 16 is adapted to be driven through a motor 20 and a gearing arrangement 24. A hopper 30 disposed on the feed end of the main body portion 12 communicates with the bore 14 through a feed opening 32. Material deposited in the hopper 30 is caused to fall into the bore 14, to be advanced through the bore 14 by the rotor 16, to an extruder head 34 which generally includes a discharge opening 36 to discharge the worked material to a receiving apparatus, not shown.

The main body portion 12 and rotor 16 of the extruder machine 10 are comprised of a plurality of individual sections, which in this example, may include a feeding and pumping section 50, a first homogenizing (mixing) section 60, a second homogenizing (mixing) section 70, a third homogenizing (mixing) section 80, and a final pumping section 90. The feeding and pumping section 50 generally includes that portion of the body 12 and rotor 16 which extend from the rearmost portion of the rotor 16 and body 12 to a point in the bore 14 substantially forward of the feed hopper 30. The rotor 16 is adapted with one or more primary flights 52, which spiral coextensively with the rotor 16, through the feeding and pumping section 50 thereof. The rotor 16 and the primary flights 52 have a function to receive material placed in the feed hopper 30 such as molten or semi-molten thermoplastic material, e.g. polyethylene, and pump it forwardly into the homogenizing sections 60, 70 and 80, of the extruder machine 12, whereupon it is similarly worked as recited in the above-mentioned U.S. Pat. No. 3,850,414, and which is incorporated herein by reference.

The homogenizing (mixing) sections 60, 70 and 80 each contain at least 3 or 4 flights, 3 in this example, which are numbered 62, 64 and 66, and these flights define at least 2 channels, a primary channel 68 and a secondary channel 72, as shown in FIGS. 2 and 4. As the material travels longitudinally through the bore 14, it is caused to enter the primary channel 68 in the first homogenizing section 60. Pressure is generated within the thermoplastic material in that channel 68, due to the rotary motion of the rotor 16, and because the primary channel 68, is for all practical purposes, blocked off at the end of that particular section, by a ring 74. The ring 74 is of annular configuration, having at least one dam 76 spaced thereabout where it crosses each secondary channel 72 on the rotor 16, permitting the flow of the material in the secondary channels 72 to pass in a throttling manner thereacross. The dam 76 in the annular ring 74 is shown in FIG. 2 in a plan view, and in FIG. 3 in a cross sectional view. The pressure generated within the primary channel 68 because of the ring 74, causes a pressure differential with respect to the secondary channel 72. The material flows, therefore, over the flight 64 which divides the primary and secondary channels 68 and 72, because the flight 64 between the two channels has a larger clearance between it and the walls of the bore 14.

The amount of shear strain necessary to homogenize the material being worked, (e.g. low density polyethylene), determines the particular number of flights and hence the number of channels and homogenizing sections required in the rotor 16. The amount of shear strain which can be imported in any one homogenizing section, 60, 70 or 80, is limited by the capability of the heat transfer flow paths 18 in causing sufficient cooling therewith. The heat transfer between the thermoplastic material being worked, and the cooling medium flowing in the heat transfer flow paths 18, is improved by utilizing a rotor 16 with at least 3 or 4 flights generally helically disposed therearound, as aforementioned, to increase the frequency that the wall of the bore 14 is scraped of material.

The shear rate, the rate at which the material is deformed by shearing, depends upon the geometry of the rotor 16, the speed of the rotor 16, and the back pressure caused by the ring 74 at the boundaries of each homogenizing section. The back pressure caused by the ring 74 is related to the clearance or the size of the dams 76 across the ring and the distance therewith between the wall of the bore 14. The size of the clearance or dam 76 can be computed to establish an equilibrium between the cooling capacity (heat ransfer capabilities) and the work input (shearing action) in the material to permit optimization thereof. The clearance between the flight 64 intermediate the primary channel 68 and the secondary channel 72 has an effect upon the material as it traverses thereacross in the homogenizing sections. The depths of the primary channels 68 and the secondary channels 72 may be varied as opposed to being similar as shown in FIG. 4, to cause the exchange of material between the channels to be even further improved. However, in manufacturing polymers such as low density polyethylene, complete homogenization may not be desirably or necessary. To this end, the bore 14 in the present invention includes a plurality of grooves or annular channels 84 disposed therearound, only one being shown as per FIG. 2. The annular channels 84 may or may not be symmetrical along the longitudinal axis of the bore 14. A non-symmetrical dam will permit gradual increases or decreases in the restriction by-pass. Each annular channel 84 is longitudinally displaced from a particular annular ring 74. The rotor 16 is axially movable incrementally a certain distance by a gearing mechanism 86 which is associated with the motor 20 and the gearing arrangement 24 articulated therewith. The distance of axial displacement of the rotor 16 is sufficient to bring at least one annular channel 84 and at least one annular ring 74 radially juxtaposed with one another. The distance between successive rings 74 and successive channels 84 may be different to permit selective or serial by-pass of the rings 74 by the extrude traveling therealong.

The axial displacement of the rotor 16 permits the homogenization extruder 10 to operate at a lower power level without homogenizing the material at all or to homogenize the material to a less than complete amount. By displacing the rotor 16 to the left, from that position shown in FIG. 2, the ring 74 and dam 76 thereon is moved to a position radially adjacent the groove or annular channel 84, to permit the resistance to flow (and shearing action) to be reduced, or eliminated, depending upon the extent of the axial displacement of the rotor 16.

Highly viscous material, which for some products do not require homogenization, can be manufactured in the extruder machine 10 with the rotor 16 displaced axially, to eliminate or reduce mixing and homogenization without generating high pressures in the extruder bore 14 and high temperatures in the material being worked, which would otherwise make it necessary to reduce the output and hence the efficiency of the extruding machine 10.

Thus, there has been shown an efficient extruding machine for varying the amount of homogenization of thermoplastics worked therethrough. That by arranging a rotor or screw in the bore of an extrusion machine to have certain restrictions to passage of material therepast, and to arrange the bore of the machine to have annular channels disposed therearound, in combination with the rotor having capabilities to be axially displaceable for restriction by-pass of extrudite provides that extrusion machine with the ability to mix and extrude a wide variety of thermoplastics in a very economical and efficient fashion.

We claim:

1. An extruder machine for the processing of thermoplastic material, comprising:
   a body having a bore extending longitudinally therethrough;
   a rotor having at least one helically disposed flight arranged therearound;
   a feed opening in one end of said body to permit any material to be worked to be deposited therein, said feed opening being in communication with said bore;
   a discharge opening in the other end of said body to permit any material worked therein to be extruded therethrough;
   said rotor having at least one generally annular restriction disposed therearound, said annular restriction having at least one depression therein to permit a flow of material therepast;
   said extruder machine also comprising a restriction bypass therewith; and means to axially displace said rotor and said annular restriction with respect to said restriction bypass in said extruder machine to permit a variance in the processing performed upon any material flowing therethrough.

2. An extruder machine for the processing of thermoplastic material, as recited in claim 1, wherein said restriction bypass comprises at least one annular channel disposed around said bore in said body.

3. An extruder machine for the processing of thermoplastic material, as recited in claim 2, wherein said annular channel is longitudinally disposed within the axial displacement distance of the annular restriction on said rotor, so that when said rotor is axially displaced, said annular channel will be radially adjacent said annular restriction to eliminate at least some of the resistance to flow of material between said bore and said rotor.

4. An extruder machine for the processing of thermoplastic material, as recited in claim 3, wherein the geometry of said annular channel in said bore along its longitudinal axis is nonsymmetrical.

5. An extruder machine for the processing of thermoplastic material, as recited in claim 4, wherein the rotor in said bore is incrementally axially displaceable, to permit controlled change of the resistance to flow of extrudite between said restriction on said rotor and said bore in the body of said machine.

* * * * *